(12) United States Patent
McClurg et al.

(10) Patent No.: US 7,321,671 B2
(45) Date of Patent: Jan. 22, 2008

(54) SYSTEM AND METHOD FOR GENERATING A PREVIEW DISPLAY IN A PRINT CAPTURING SYSTEM USING A NON-PLANAR PRISM

(75) Inventors: George W McClurg, Jensen Beach, FL (US); Greg L Cannon, Boynton Beach, FL (US); Richard V Voorhees, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 830 days.

(21) Appl. No.: 10/725,541

(22) Filed: Dec. 3, 2003

(65) Prior Publication Data
US 2004/0109589 A1 Jun. 10, 2004

Related U.S. Application Data

(60) Provisional application No. 60/491,537, filed on Aug. 1, 2003, provisional application No. 60/431,240, filed on Dec. 6, 2002.

(51) Int. Cl.
G06K 9/00 (2006.01)
(52) U.S. Cl. ..................................... 382/124
(58) Field of Classification Search ........ 382/123–127, 382/170, 311
See application file for complete search history.

(56) References Cited

U.S. PATENT DOCUMENTS

| | | | |
|---|---|---|---|
| 1,501,979 A | 7/1924 | Willson | |
| 2,146,662 A | 2/1939 | Van Albada | |
| 2,184,858 A | 12/1939 | Goodman | |
| 3,054,854 A | 9/1962 | Neasham | |
| 3,282,152 A | 11/1966 | Myer | |

(Continued)

FOREIGN PATENT DOCUMENTS

JP 3-161884 7/1991

(Continued)

OTHER PUBLICATIONS

International Search Report and Written Opinion (dated Jul. 13, 2005) related to PCT/US04/33400, filed Oct. 12, 2004.

(Continued)

*Primary Examiner*—Daniel Mariam
(74) *Attorney, Agent, or Firm*—Sterne, Kessler, Goldstein & Fox P.L.L.C.

(57) ABSTRACT

A system and method is provided for generating a preview display of a captured print image from a non-planar platen and for generating a high resolution display of a user-selected area of the preview display. The display processing system comprises a preview generation module and optionally a high resolution display processing module. After a group of captured radial scan line images is received, the preview generation module determines the representative pixel values for pixels in the group. The polar coordinate system position of the respective group is then converted to a position in the display window coordinates. The representative pixel values are plotted at the corresponding display window coordinates. The operator can request a high resolution display of an area of the preview display. When a request is received, the captured image data within that area is converted to rectangular system coordinates and displayed.

11 Claims, 13 Drawing Sheets

U.S. PATENT DOCUMENTS

| | | |
|---|---|---|
| 3,333,502 A | 8/1967 | Flanagan |
| 3,511,571 A | 5/1970 | Ogle |
| 3,581,282 A | 5/1971 | Altman |
| 3,648,240 A | 3/1972 | Jacoby et al. |
| 3,716,301 A | 2/1973 | Caulfield et al. |
| 3,765,018 A | 10/1973 | Heard et al. |
| 3,804,524 A | 4/1974 | Jocoy et al. |
| 3,806,706 A | 4/1974 | Hasslinger et al. |
| 3,882,462 A | 5/1975 | McMahon |
| 4,032,889 A | 6/1977 | Nassimbene |
| 4,106,078 A | 8/1978 | Inoue |
| 4,128,837 A | 12/1978 | Page |
| 4,180,306 A | 12/1979 | Duhrkoop et al. |
| 4,206,441 A | 6/1980 | Kondo |
| 4,206,556 A | 6/1980 | Sabo et al. |
| 4,215,274 A | 7/1980 | Segall |
| 4,357,597 A | 11/1982 | Butler |
| 4,387,365 A | 6/1983 | Berry et al. |
| 4,414,684 A | 11/1983 | Blonder |
| 4,420,261 A | 12/1983 | Barlow et al. |
| 4,461,576 A | 7/1984 | King |
| 4,467,545 A | 8/1984 | Shaw, Jr. |
| 4,578,793 A | 3/1986 | Kane et al. |
| 4,611,881 A | 9/1986 | Schmidt et al. |
| 4,637,718 A | 1/1987 | Kirchner et al. |
| 4,684,802 A | 8/1987 | Hakenewerth et al. |
| 4,688,092 A | 8/1987 | Kamel et al. |
| 4,701,960 A | 10/1987 | Scott |
| 4,720,869 A | 1/1988 | Wadia |
| 4,736,203 A | 4/1988 | Sidlauskas |
| 4,736,436 A | 4/1988 | Yasukawa et al. |
| 4,751,660 A | 6/1988 | Hedley |
| 4,751,759 A | 6/1988 | Zoell |
| 4,774,516 A | 9/1988 | Henri et al. |
| 4,783,167 A | 11/1988 | Schiller et al. |
| 4,790,025 A | 12/1988 | Inoue et al. |
| 4,792,226 A | 12/1988 | Fishbine et al. |
| 4,794,260 A | 12/1988 | Asano et al. |
| 4,805,117 A | 2/1989 | Fiore et al. |
| 4,821,118 A | 4/1989 | Lafreniere |
| 4,925,300 A | 5/1990 | Rachlin |
| 5,140,469 A | 8/1992 | Lamarre et al. |
| 5,146,102 A | 9/1992 | Higuchi et al. |
| 5,225,924 A | 7/1993 | Ogawa et al. |
| 5,243,459 A | 9/1993 | Winston et al. |
| 5,249,370 A | 10/1993 | Stanger et al. |
| 5,307,264 A | 4/1994 | Waggener et al. |
| 5,309,274 A | 5/1994 | Akanabe |
| 5,313,306 A | 5/1994 | Kuban et al. |
| 5,367,399 A | 11/1994 | Kramer |
| 5,377,002 A | 12/1994 | Malin et al. |
| 5,440,428 A | 8/1995 | Hegg et al. |
| 5,452,135 A | 9/1995 | Maki et al. |
| 5,467,403 A * | 11/1995 | Fishbine et al. ............ 382/116 |
| 5,469,289 A | 11/1995 | Iwao et al. |
| 5,526,436 A | 6/1996 | Sekiya |
| 5,528,355 A | 6/1996 | Maase et al. |
| 5,588,097 A | 12/1996 | Ono et al. |
| 5,610,751 A | 3/1997 | Sweeney et al. |
| 5,629,764 A | 5/1997 | Bahuguna et al. |
| 5,638,461 A | 6/1997 | Fridge |
| 5,650,842 A | 7/1997 | Maase et al. |
| 5,677,763 A | 10/1997 | Redmond |
| 5,677,782 A | 10/1997 | Peng |
| 5,699,186 A | 12/1997 | Richard |
| 5,745,591 A | 4/1998 | Feldman |
| 5,761,330 A | 6/1998 | Stoianov et al. |
| 5,777,751 A | 7/1998 | Ward |
| 5,796,426 A | 8/1998 | Gullichsen et al. |
| 5,798,923 A | 8/1998 | Laskowski |
| 5,825,474 A | 10/1998 | Maase |
| 5,892,599 A | 4/1999 | Bahuguna |
| 5,937,102 A | 8/1999 | Jin |
| 6,021,007 A | 2/2000 | Murtha |
| 6,038,332 A | 3/2000 | Fishbine et al. |
| 6,041,134 A | 3/2000 | Merjanian |
| 6,046,867 A | 4/2000 | Rana |
| 6,175,407 B1 | 1/2001 | Sartor |
| 6,198,429 B1 | 3/2001 | Fujikawa et al. |
| 6,198,836 B1 | 3/2001 | Hauke |
| 6,243,488 B1 | 6/2001 | Penna |
| 6,341,028 B1 | 1/2002 | Bahuguna et al. |
| 6,373,969 B1 | 4/2002 | Adler |
| 6,381,350 B1 * | 4/2002 | Klingensmith et al. ...... 382/128 |
| 6,394,356 B1 | 5/2002 | Zagami |
| 6,411,441 B1 | 6/2002 | Videen |
| 6,415,064 B1 | 7/2002 | Oh |
| 6,424,470 B1 | 7/2002 | Lindner |
| 6,459,451 B2 | 10/2002 | Driscoll, Jr. et al. |
| 6,466,686 B2 | 10/2002 | Senior |
| 6,496,608 B1 | 12/2002 | Chui |
| 6,616,065 B2 | 9/2003 | Martin |
| 6,928,195 B2 | 8/2005 | Scott et al. |
| 6,993,165 B2 | 1/2006 | McClurg et al. |
| 7,081,951 B2 | 7/2006 | Carver et al. |
| 2002/0049714 A1 | 4/2002 | Yamazaki et al. |
| 2002/0141620 A1 | 10/2002 | Monden |
| 2003/0012417 A1 | 1/2003 | Hamid |
| 2003/0099022 A1 | 5/2003 | Karin et al. |
| 2003/0142856 A1 | 7/2003 | McClurg et al. |
| 2003/0197853 A1 | 10/2003 | Fenrich |
| 2003/0206287 A1 | 11/2003 | McClurg et al. |
| 2004/0109245 A1 | 6/2004 | McClurg et al. |
| 2004/0109591 A1 | 6/2004 | McClurg et al. |
| 2004/0114785 A1 | 6/2004 | McClurg et al. |
| 2004/0114786 A1 | 6/2004 | Cannon et al. |
| 2005/0105078 A1 | 5/2005 | Carver et al. |

FOREIGN PATENT DOCUMENTS

| | | |
|---|---|---|
| WO | WO 96/17480 A2 | 6/1996 |
| WO | WO 96/17480 A3 | 6/1996 |

OTHER PUBLICATIONS

International Search Report from PCT Appl. No. PCT/US03/38536, filed Dec. 4, 2003, 4 pages.

International Search Report from PCT Appl. No. PCT/US03/38644, filed Dec. 5, 2003, 3 pages.

English Abstract for Japanese Patent Publication No. 3-161884, published Jul. 7, 1991, 1 page, from http://v3.espacenet.com/.

McClurg et al., U.S. Appl. No. 10/725,543, filed Dec. 3, 2003, entitled "System Having a Rotating Optical System and a Non-Planar Prism that are Used to Obtain Print and Other Hand Characteristic Information," 41 pages.

* cited by examiner

SYSTEM AND METHOD FOR GENERATING A PREVIEW DISPLAY IN A PRINT CAPTURING SYSTEM USING A NON-PLANAR PRISM

CROSS-REFERENCE TO RELATED APPLICATIONS

This application claims the benefit of U.S. Provisional Application No. 60/431,240, filed Dec. 6, 2002, and U.S. Provisional Application No. 60/491,537, filed Aug. 1, 2003, both of which are incorporated herein by reference in their entireties.

BACKGROUND OF THE INVENTION

1. Field of the Invention

The present invention pertains to biometric imaging technology, and in particular, to live scanning of prints.

2. Background

Law enforcement, banking, voting, and other commercial industries rely upon biometrics (e.g., handprint, fingerprints, etc.) as a means for authenticating the identity of an individual. The biometric processing applications used by these industries require the capturing of high quality biometric image.

Biometric imaging systems may include, but are not limited to, print imaging systems. Such print imaging systems are also referred to as scanners or live scanners. In conventional live scanners, an object such as a hand or finger is placed on the outer surface of a platen. The platen surface can be a surface of a prism or another surface in optical contact with an outside surface of a prism. For example, a platen surface can be a surface of an optical protective layer (e.g., silicon pad) placed on a prism. To produce raw image data representing the biometric print data, an illumination source illuminates the underside of the object. Raw image data representative of valleys, ridges, and other minutiae of a print are then captured.

Proper placement of the print pattern on the platen surface is critical to capturing a high quality image suitable for biometric applications. Even a slight deviation in placement or in the pressure applied by the subject could result in captured image data that is unusable by downstream applications. As a result, prior to forwarding the image data to downstream applications, a system operator typically evaluates the image to ensure that adequate image data has been captured. This evaluation requires the system operator to wait until the scan is completed and the image displayed. Extensive waiting time however is inconvenient and wasteful for both the system operator and the subject.

Therefore, a need exists for a display processing system that can provide rapid visual feedback to allow a system operator to evaluate print placement on the platen surface.

BRIEF SUMMARY OF THE INVENTION

The inventors recognized that an extensive waiting time may be encountered for large platen areas and in particular for a non-planar surface such as a conical prism large enough to capture an image of one or two hands. The present invention is directed to a system and method for generating a preview display of a captured image of a print pattern placed on a non-planar surface. In accordance with embodiments of the present invention, the display processing system includes a preview generation module and a memory. The display processing system can be implemented in a live scanner or as a system external to a live scanner.

In an embodiment of the invention, the display processing system receives a group of captured radial scan line images from a scanning and capturing system. The preview generation module then determines the average sensor pixel values for pixels in the group of captured radial scan line images. Next, the polar coordinate system position of the respective group of captured radial scan line images is converted to a position in the display window coordinates. The average sensor pixel values are then plotted at the corresponding display window coordinates and displayed in the display window.

The present invention is also directed to a system and method for generating a high resolution display of an area of the preview display. This area can be an area within a preview display selected by the system operator. In accordance with embodiments of the present invention, the display processing system includes a preview generation module, a high resolution display processing module, and a memory. The display processing system is coupled to an image conversion system. The display processing system can be implemented in a biometric imaging system or as a system external to a biometric imaging system.

In an embodiment of the present invention, a system operator selects an area of the preview display and requests a high resolution display of that area. When the request is received, the high resolution display processing module invokes conversion processing in the image conversion system. For each pixel in the selected area, the image conversion system retrieves an entry in the conversion data array and one or more samples from the captured raw polar image data. The image conversion system then interpolates the retrieved samples using weighting based on the retrieved conversion data array entry to obtain the respective pixel value in the second coordinate system. After all pixels in the selected area have been processed, the image conversion system communicates the converted image data to the display processing module. The display processing module then displays the high resolution image in the display window.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
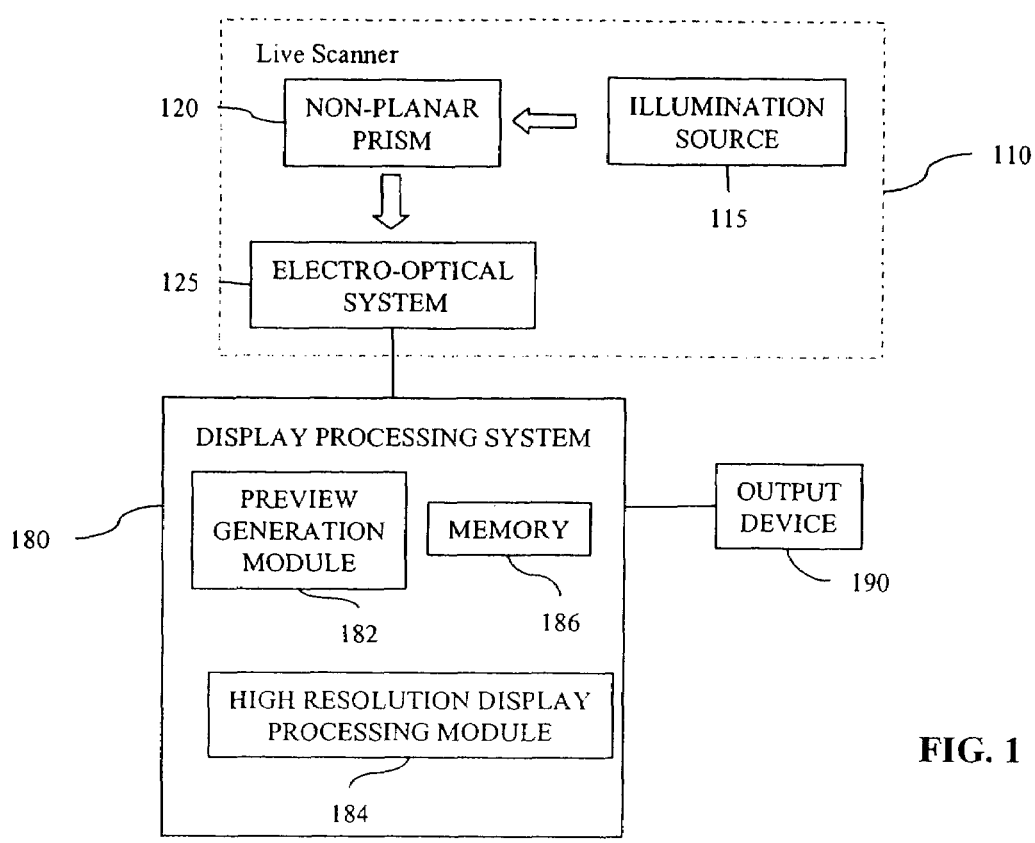
FIG. 1 shows a block diagram of a system for generating a preview display of a captured image in accordance with an embodiment of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

FIG. 1 shows a block diagram of a system 100 for generating a preview display of a captured image in accordance with an embodiment of the present invention. System 100 includes a live scanner 110 coupled to display processing system 180. Live scanner 110 includes a non-planar prism 120 optically coupled between an illumination source 115 and an electro-optical system 125. In an embodiment, non-planar prism 120 is a conical prism with a large platen surface area as described further with respect to FIG. 3.

Electro-optical system 125 captures biometric data from objects interacting with non-planar prism in a polar coordinate system format and communicates the captured raw image data to the display processing system 180. For example, electro-optical system 125 can include an optical subsystem such as one or more lenses that focus an image on a platen surface of prism 120 onto a camera. An exemplary scanning imaging system 125 is described in co-pending U.S. patent application entitled, "System Having A Rotating Optical System And A Non-Planar Prism That Are Used To Obtain Print And Other Hand Characteristic Information," Ser. No. 10/725,543, by McClurg et al., filed concurrently herewith and incorporated in its entirety herein by reference.

Display processing system 180 includes a preview generation module 182 and a memory 186. In an embodiment, display processing system 180 may also include a high resolution display processing module 184. Preview generation module 182 has logic to generate a preview image of an object being scanned by the scanning and capturing system 110. High resolution display processing module comprises logic to generate a high resolution display based on a request received from an output device. The display request includes the boundary points of the selected area of the preview display.

In an embodiment, display processing system 180 is implemented in software. Persons skilled in the relevant art(s) will appreciate that functions of display processing system 180 can be implemented in hardware, firmware, or a combination of software and hardware/firmware.

Display processing system 180 is coupled to output device 190. Output device 190 includes a user interface for providing outputs to users such as visual, audible, or tactile indications and for receiving inputs from a user such as control inputs for starting/stopping a scan and powering system 100 on and off. An example output device is described further below with respect to FIG. 2.

Figure 2:
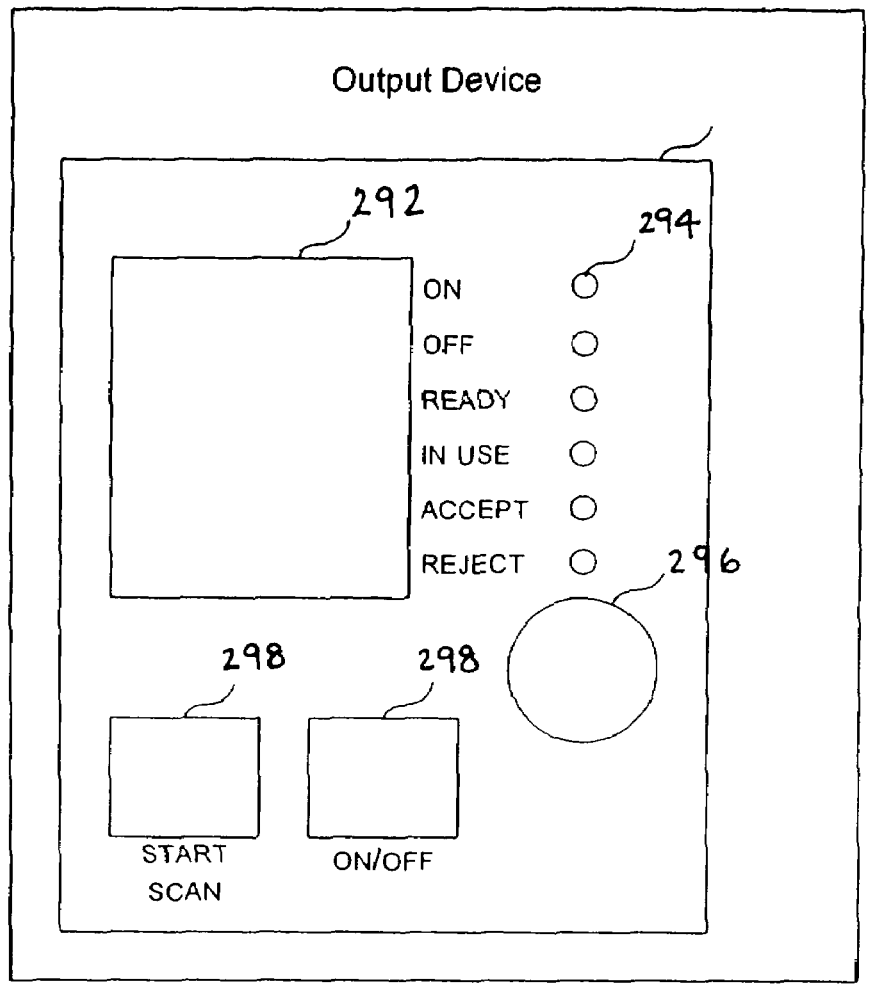
FIG. 2 shows a portion of an output device in accordance with an embodiment of the present invention.

FIG. 2 shows a portion 291 of output device 190 in accordance with an embodiment of the present invention. Portion 291 includes a display window 292 for displaying the preview image. In an alternate embodiment, portion 291 also includes one or more visual indicators 294 (e.g., LEDs), and/or an audio device 296 for indicating status information about a scan. Portion 291 can also include input devices 298.

Figure 3:
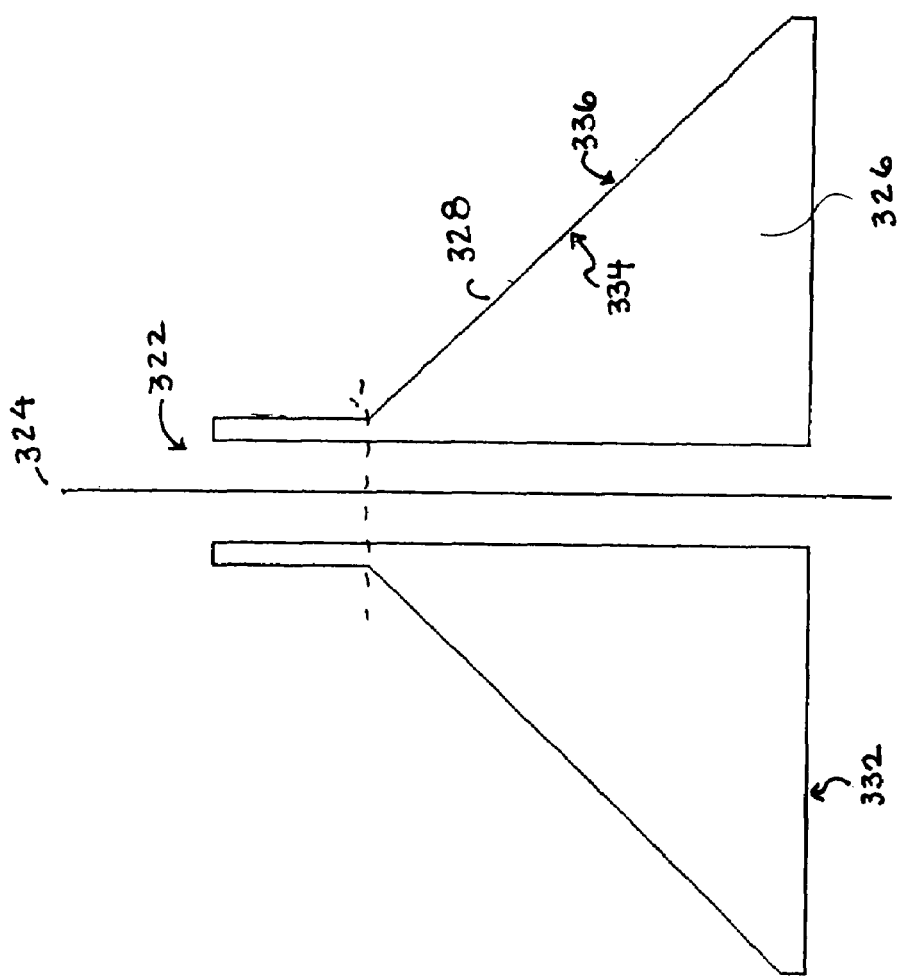
FIG. 3 shows a view of a non-planar prism in accordance with an embodiment of the present invention.

FIG. 3 depicts a cross-sectional view of an exemplary non-planar prism 320 in accordance with an embodiment of the present invention. Non-planar prism 320 has an opening 322 running along an axis of symmetry 324. Opening 322 is defined within an area 326 of non-planar prism 320 that has a non-planar first section 328 and a substantially planar second section 332. A first surface 336 of first section 328 is shaped so as to provide the non-planar aspect to prism 320. The non-planar shape is preferably approximately a conical surface, but can also be curved, spherical, or the like, so long as a second surface 334 provides total internal reflection of an incident beam.

Exemplary live scanners having non-planar prisms that can be used herein are described in co-pending U.S. patent application entitled, "System for Obtaining Print and Other Hand Characteristics Using A Non-Planar Prism," Ser. No. 10/725,537, by McClurg et al., filed concurrently herewith and incorporated herein by reference in its entirety and co-pending U.S. patent application entitled, "A Non-planar Prism Used in a System for Obtaining Print and Other Hand Characteristic Information," Ser. No. 10/725,539, by McClurg et al., filed concurrently herewith and incorporated herein by reference in its entirety.

Figure 4:
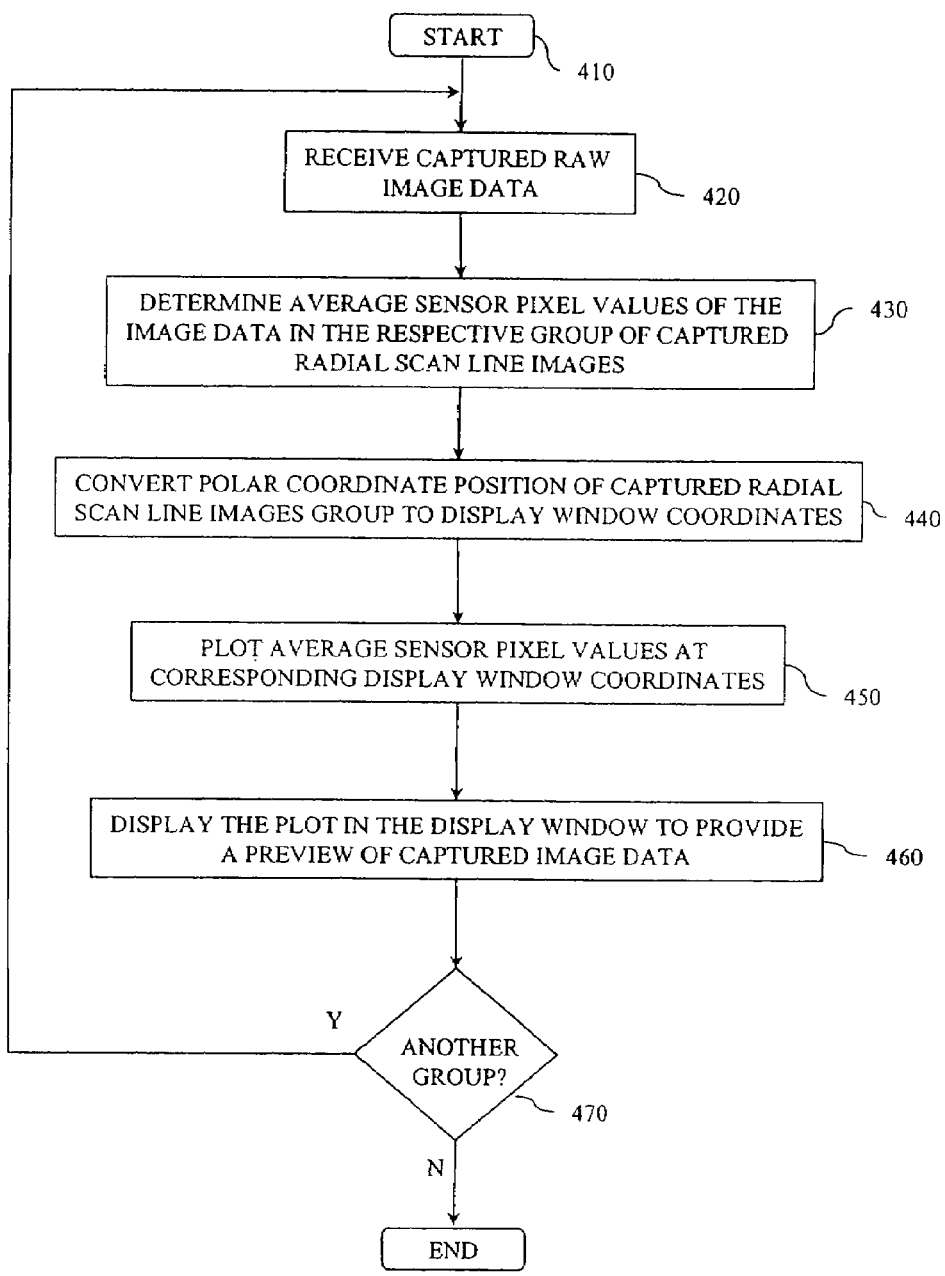
FIG. 4 shows a flowchart depicting a method for generating a preview display image.

FIG. 4 depicts a flowchart of a method 400 for generating a preview display of a print pattern placed on a non-planar platen surface in accordance with the present invention. Method 400 will be described with continued reference to display processing system 180 depicted in FIG. 1, above.

In an embodiment of the present invention, method 400 is initiated by the system operator via a user-interface at the output device 190. Alternatively, method 400 could be initiated automatically. For example, the system operator may have the option of selecting a Preview Display command on a user-interface screen. In an alternate embodiment, method 400 is automatically initiated each time a scan is performed. Method 400 is a process loop which is performed for each group of radial scan line images captured during a scan. A group of radial scan line images consists of one or more radial scan lines. In one example, a group of radial scan lines is made up of approximately 25 scan lines.

Prior to the start of method 400, a scan is initiated in a live scanner 110. The scan can begin automatically or manually (e.g., in response to a selection at a user interface to initiate a scan). During the scan, the electro-optical system 125 captures image data from a platen surface scanning area. The captured image data can include raw image data representative of a print pattern from which biometric data (such as finger minutiae, ridge data, and/or other finger, palm, and hand characteristic information) can be extracted. This image data is communicated to the display processing system internally or via a data network.

Figure 4A:
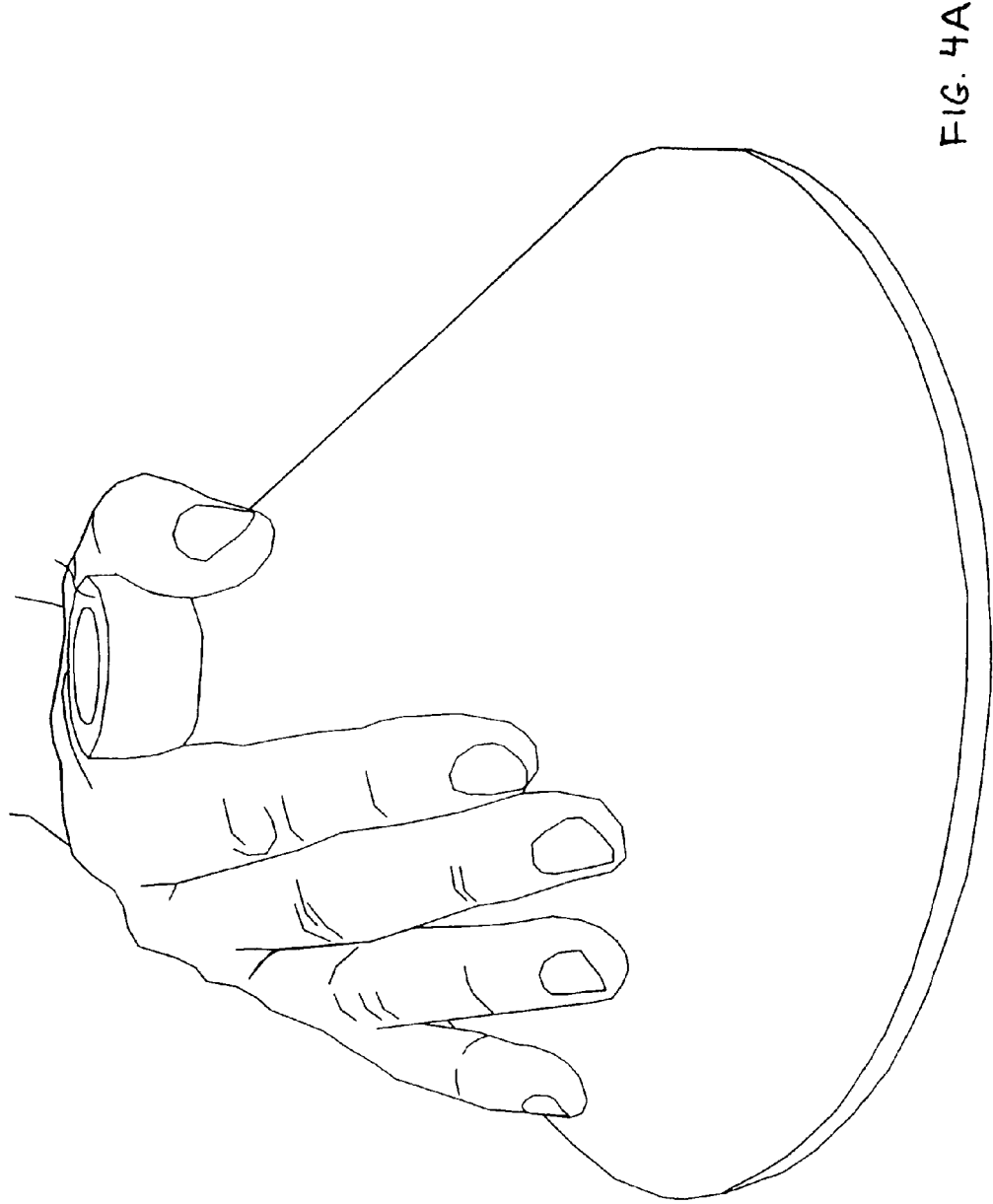
FIG. 4A illustrates how a subject places a hand on a non-planar prism in accordance with an embodiment of the present invention.
Figure 4B:
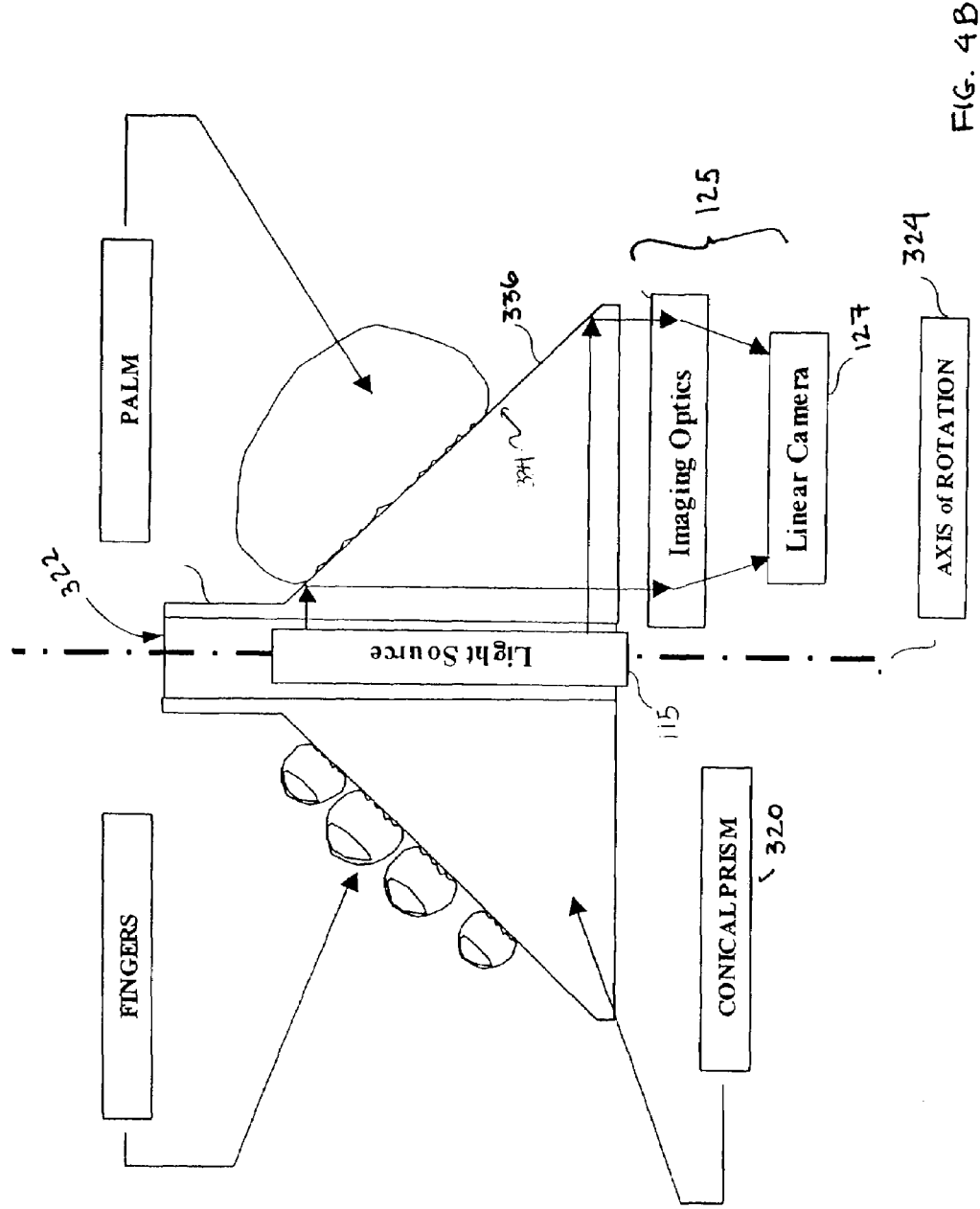
FIG. 4B shows a position for an illumination source in accordance with an embodiment of the present invention.
Figure 4C:
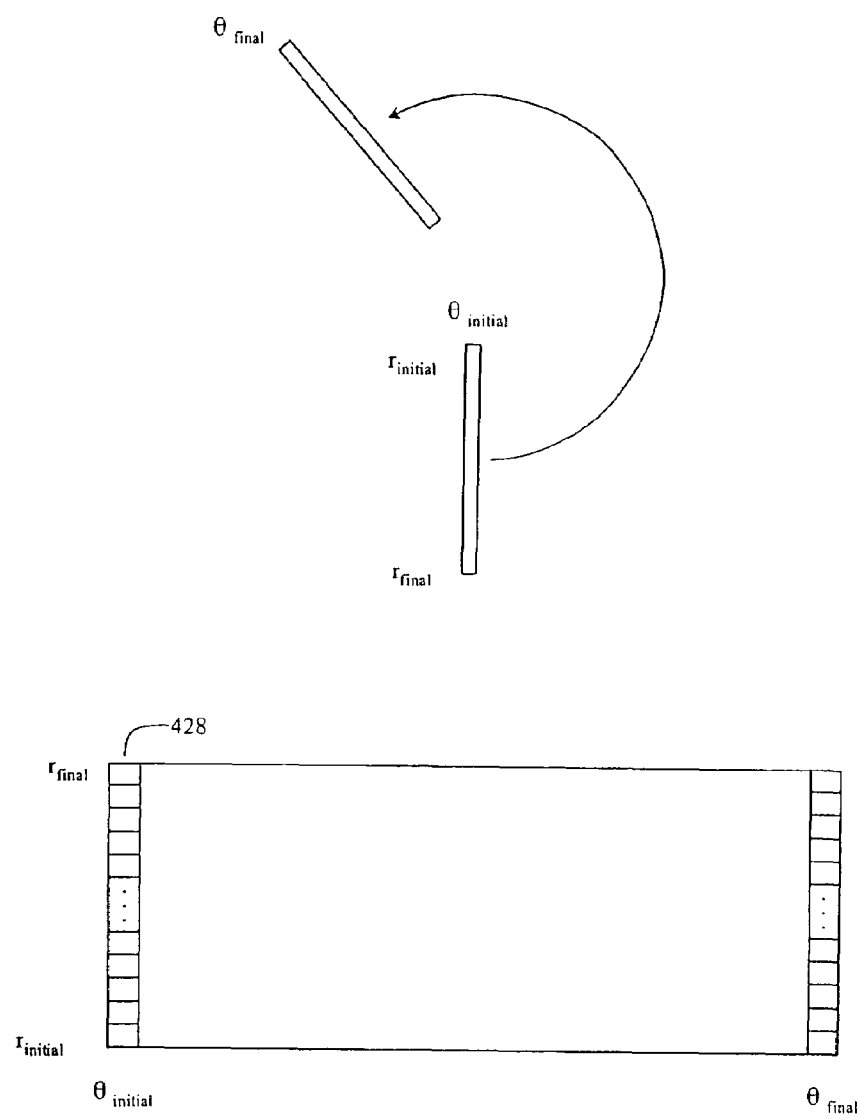
FIG. 4C is a diagram that illustrates radial scan line images captured along an arcuate scan path and stored in an array.

FIGS. 4A-C illustrate the scanning and capturing process in a biometric imaging system having an exemplary conical platen surface in accordance with an embodiment of the present invention. FIG. 4A illustrates the placement of a subject's hand on a conical platen surface during the scan. FIG. 4B shows a cross-sectional view of a portion of the biometric imaging system performing the scan. In this embodiment, illumination source 115 is positioned in opening 322 of non-planar prism 320. Based on the reflection angle of a beam from illumination source 115 off the second surface 334, the scanning imaging system 125 captures pixel images. Electro-optical scanner 125 can rotate about axis 324 (e.g., axis of rotation) to capture images from surface 336.

FIG. 4C illustrates a scan of a print pattern placed on the conical platen surface depicted in FIGS. 4A and B. As shown in the example diagram in FIG. 4C, a linear camera 127 having a length between a radius $r_{initial}$ and $r_{final}$ moves from an initial angular position $\theta_{initial}$ along an arcuate path y to a final angular position $\theta_{final}$. In this way, the linear camera 127 sweeps out a path in polar space over an area between angular positions $\theta_{initial}$ and $\theta_{final}$ and radial positions $r_{initial}$ and $r_{final}$.

As the linear camera scans, radial scan lines of image data 428 (referred to herein as polar space raw image data) are successively captured and communicated to the display processing system 180. In practice, because of the conical platen surface, image data is captured and stored at a higher resolution (e.g., a greater dpi) in the scanning area near the top of the conical platen surface that is, closer to radial position $r_{initial}$, compared to the scanning area near the base of the conical area, that is, closer to radial position $r_{final}$. The capture and storing of radial scan line image data proceeds until the linear camera has swept a desired scanning path.

The process of performing a scan in a biometric imaging system having a non-planar prism is described in co-pending U.S. patent application entitled, "Methods For Obtaining Print And Other Hand Characteristic Information Using A Non-Planar Prism," Ser. No. 10/725,540, by McClurg et al., filed concurrently herewith and incorporated in its entirety herein by reference.

Returning to FIG. 4, in step 420, the display processing system 180 receives a group of captured radial scan line images from a scanning and capturing system. The captured radial scan line images are in a polar coordinate system format. After a group is received, the preview generation module 182 determines the average sensor pixel values for pixels in the group of captured radial scan line images (step 430). Next, the polar coordinate system position of the respective group of captured radial scan line images is converted to a position in the display window coordinates (step 440) by the preview display module.

In step 450, the average sensor pixel values are plotted at the corresponding display window coordinates and displayed in the display window of output device 190 (step 460). In this way, a preview display can be provided quickly and, as groups of radial line scan images are processed, can sweep across an arcuate path in the display window to provide a visual image approximating the actual captured data. In step 470, preview display processing module determines whether another group of radial scan line images remains to be processed. If another group exists, then method 400 repeats. If no other group exists, method 400 ends until re-initiated.

Using method 400, a quick preview display can be output as image data is being captured across a large platen surface. Such a preview is even more helpful when more time consuming operations such as coordinate conversion are needed when processing the scanned image.

In an alternate embodiment of the present invention, preview generation module 182 stores the converted display window coordinates temporarily in memory 186 until all the groups of scan line images have been processed. After all the groups have been processed, the average pixel values are plotted and displayed. In this embodiment, step 450 and 460 are performed only once during generation of the preview image.

Figure 5:
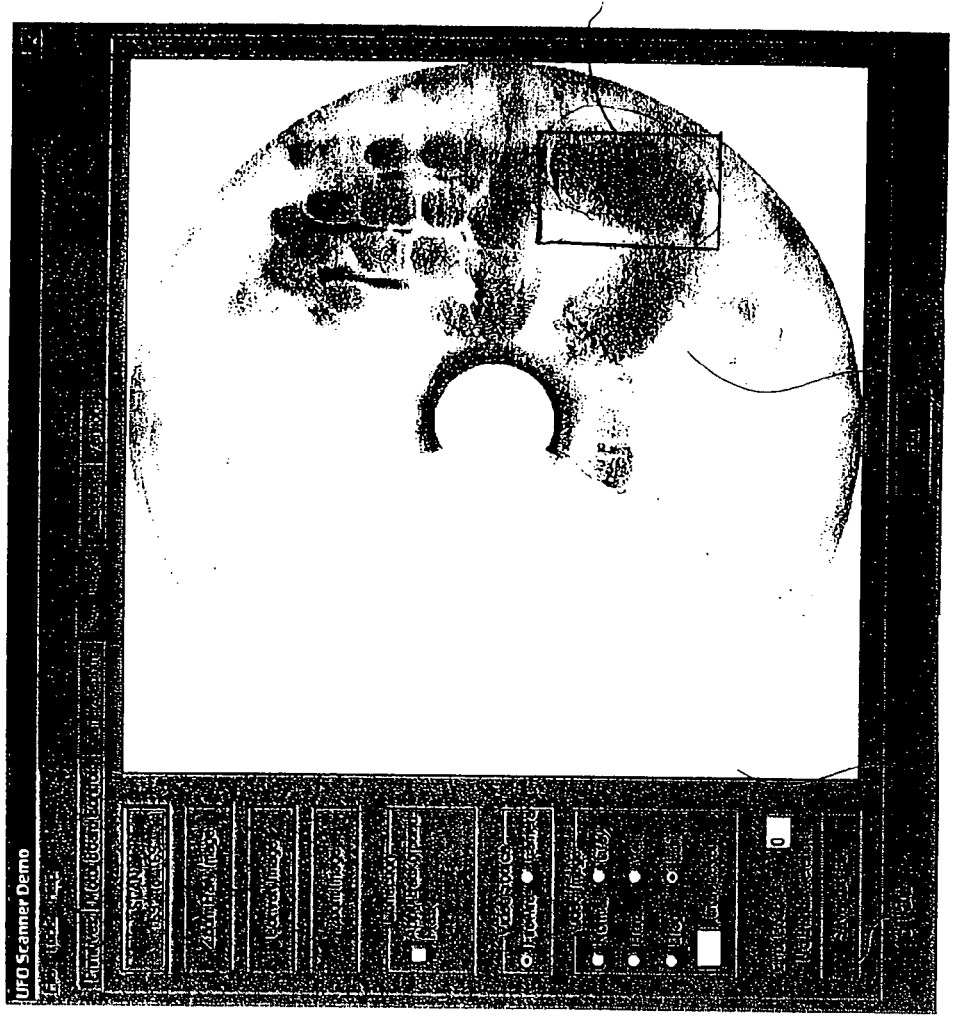
FIG. 5 illustrates an exemplary preview display image.

FIG. 5 illustrates an exemplary preview display of a hand print image. Upon viewing the preview display, a system operator may desire a more detailed view of a portion of the displayed image. For example, the system operator may wish to view a high resolution image of the print contained in area 565. In an embodiment, the output device 190 provides a mechanism (such as a graphical user interface) for the system operator to select an area and request the high resolution display. For example, the system operator may have the option of highlighting an area of interest with a mouse or cursor and selecting a Convert Image command on the user-interface screen.

Figure 6:
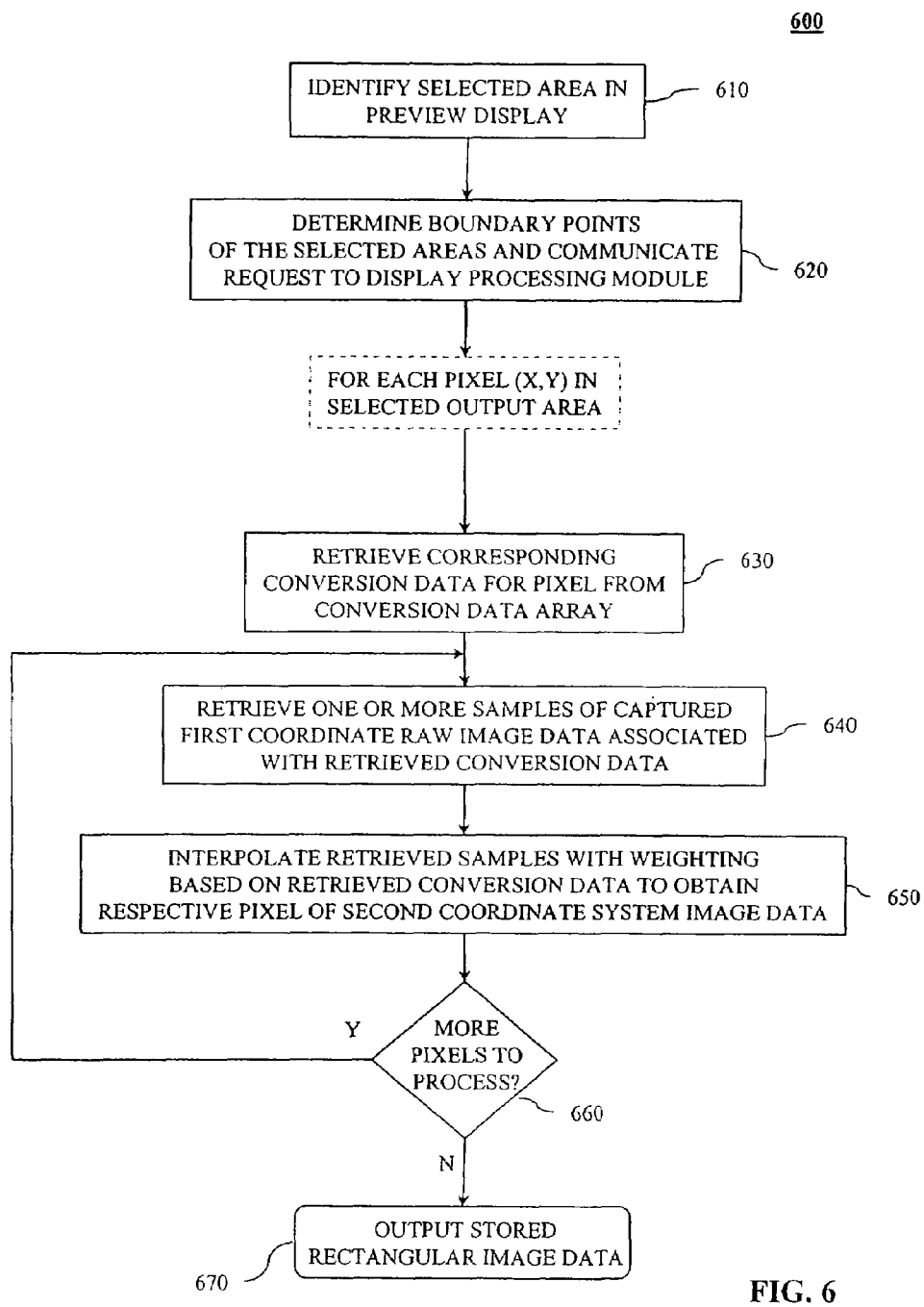
FIG. 6 shows a flowchart depicting a method for generating a high resolution image of a selected area of a preview display image.

FIG. 6 depicts a flowchart 600 of a method for generating a high resolution display of a selected portion of the preview display. Method 600 will be described with continued reference to system 800 depicted in FIG. 8A, below.

Prior to the start of method 600, a preview image is generated and displayed at an output device 190 according to method 400 described above. After the preview image is displayed, method 600 begins when a system operator identifies a selected area in the preview display window and requests a high resolution display of that area. Alternatively, system 800A can automatically select an area and initiate a high resolution display. In step 620, the boundary points of the selected area are determined and communicated to the high resolution display processing module 184 in a request message. Upon receiving the request, the high resolution display processing module 184 invokes coordinate conversion processing in the image conversion system 850.

For each pixel in the selected preview display area, a conversion process (steps 630-660) is performed in the image conversion system to provide a high-resolution display of the image in the selected area. In step 630, conversion data for the pixel being processed is retrieved by the coordinate conversion module 854 from the conversion data array stored in memory 856. The retrieved conversion data entry includes polar coordinates and offset data associated with the (x,y) pixel position. The coordinate conversion module 854 also retrieves one or more samples of the captured polar image data associated with the polar coordinate values from the conversion array entry (step 640). In step 650, the retrieved samples are interpolated with a weighting based on the polar offset data to obtain the respective pixel value in rectangular image space. In step 660, a decision is made whether there are more pixels to process. If yes, method 600 returns to step 630. If no more pixels remain to process, the stored rectangular image data is communicated to the high resolution display processing module 184 and then output to the display window of output device 190.

In an embodiment of the present invention, after the conversion process is complete, the high resolution display processing module 184 may generate a preview image instead of a high resolution image. In this embodiment, the high resolution display processing module 184 determines a representative pixel value for pixels in a group using a decimation technique. For example, the processing module may select every $n^{th}$ pixel as the representative pixel value for that group. Alternatively, the processing module may select a pixel at random.

Method 600 provides an advantage to a user because a user can initiate a quick preview display early in a scan and then select an area of interest in which to display an even higher resolution image of a print pattern. This is especially helpful to ensure proper placement of the print pattern on the non-planar surface of a large area conical prism before such a large amount of image data is sent for further image processing. The ability of a user to select an area of interest with the preview display has many advantages such as providing an opportunity to engage a user especially during a long scan time and allowing a user to interactively examine different parts of a scanned image at a high resolution. Providing a preview display and a high resolution display of a selected area of interest is especially important in the case of a conical platen surface where a target's hands may slide or roll down the surface or where the user may not have the benefit of trained personnel nearby to assist during the capture.

An exemplary image conversion system is described in more detail in the co-pending U.S. patent application entitled, "System And Method For Capturing Print Information Using A Coordinate Conversion Method," Ser. No. 10/725,542, by Cannon et al., filed concurrently herewith and incorporated in its entirety herein by reference.

In an alternate embodiment, the orientation of a print being displayed can also be adjusted. During method 400 and method 600, the display processing system 180 determines the center of the scanned image (e.g., the center of the handprint or the center of the fingerprint). For example, the image center can be represented by a coordinate point or by horizontal and/or vertical lines. The system 180 then assigns the image center as the root for display and conversion processing. By identifying the center, the display processing system 180 can rotate the orientation of the print image during processing. In this way, the print image can be displayed in the correct orientation without requiring additional processing to correct the orientation. In an alternate embodiment of high resolution display processing method 600, the coordinate conversion module can adjust the orientation during conversion processing.

Figure 7:
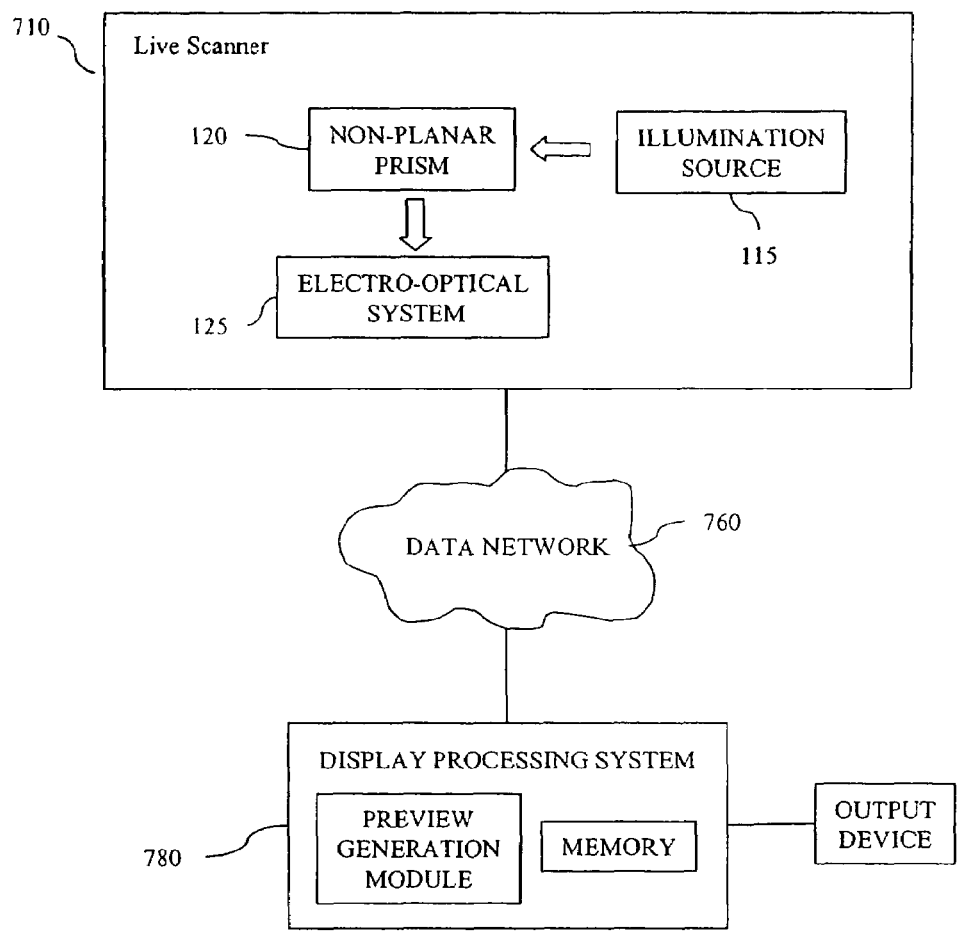
FIG. 7 shows a block diagram of a preview display system for generating a preview display of a captured image in accordance with an alternate embodiment of the present invention.
Figure 8A:
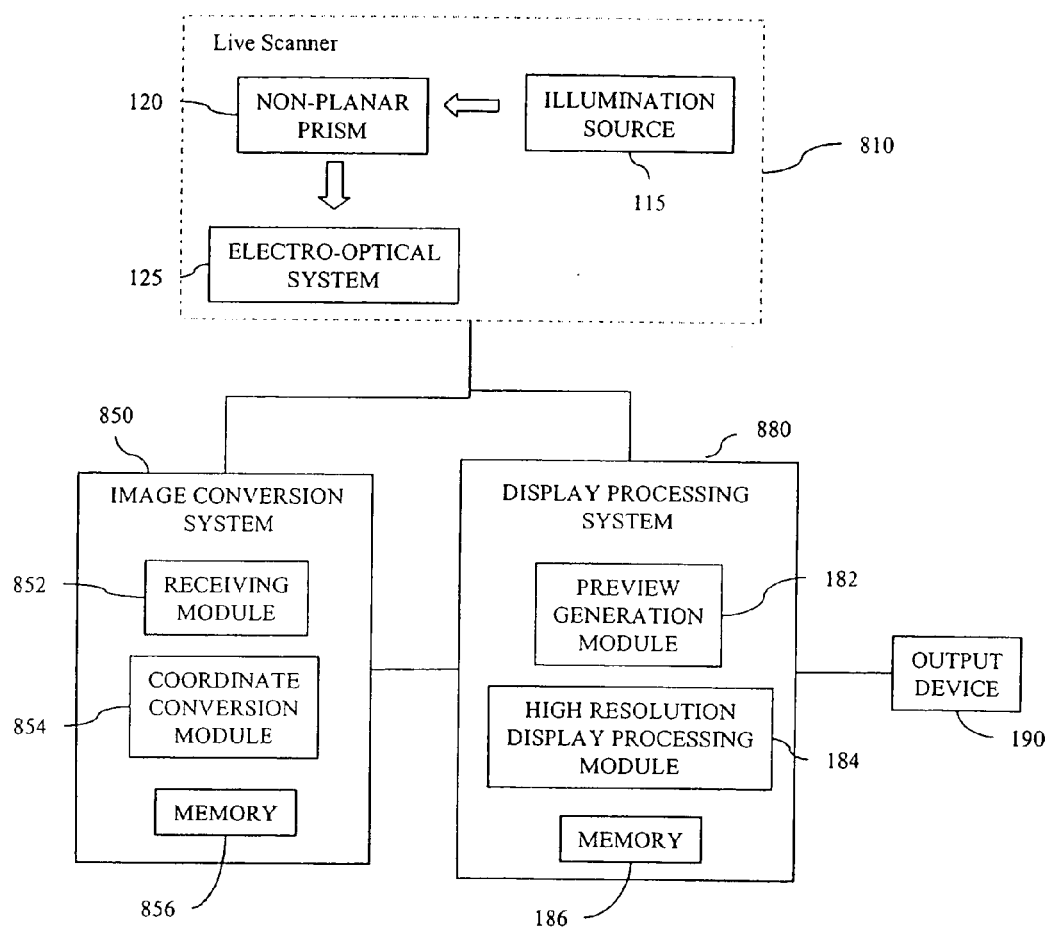
FIG. 8A shows a block diagram of a preview display system for generating a high resolution display of a selected area of a preview display in accordance with an embodiment of the invention.
Figure 8B:
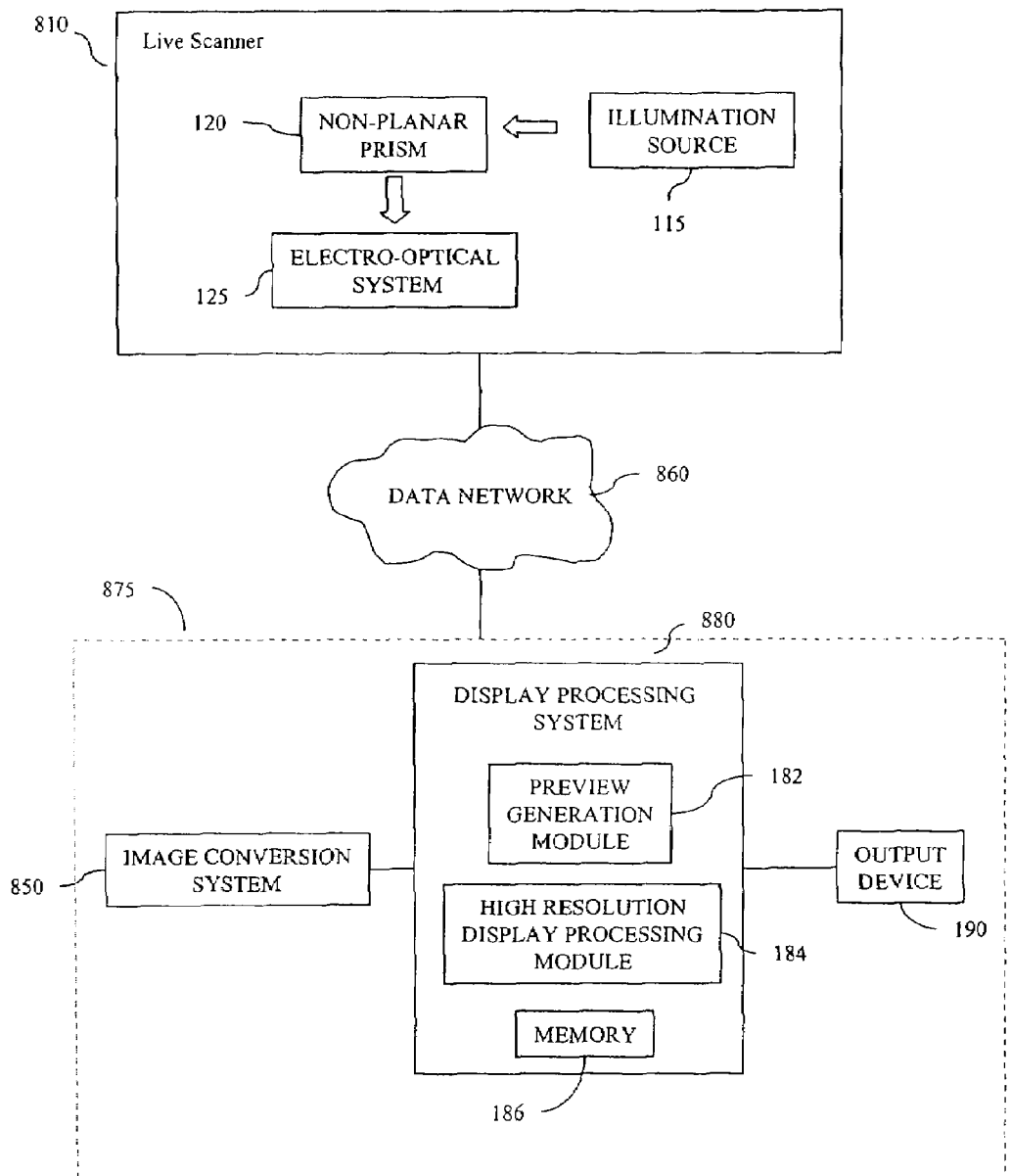
FIG. 8B shows a block diagram of a preview display system for generating a high resolution display of a selected area of a preview display in accordance with an alternate embodiment of the invention.
Figure 9:
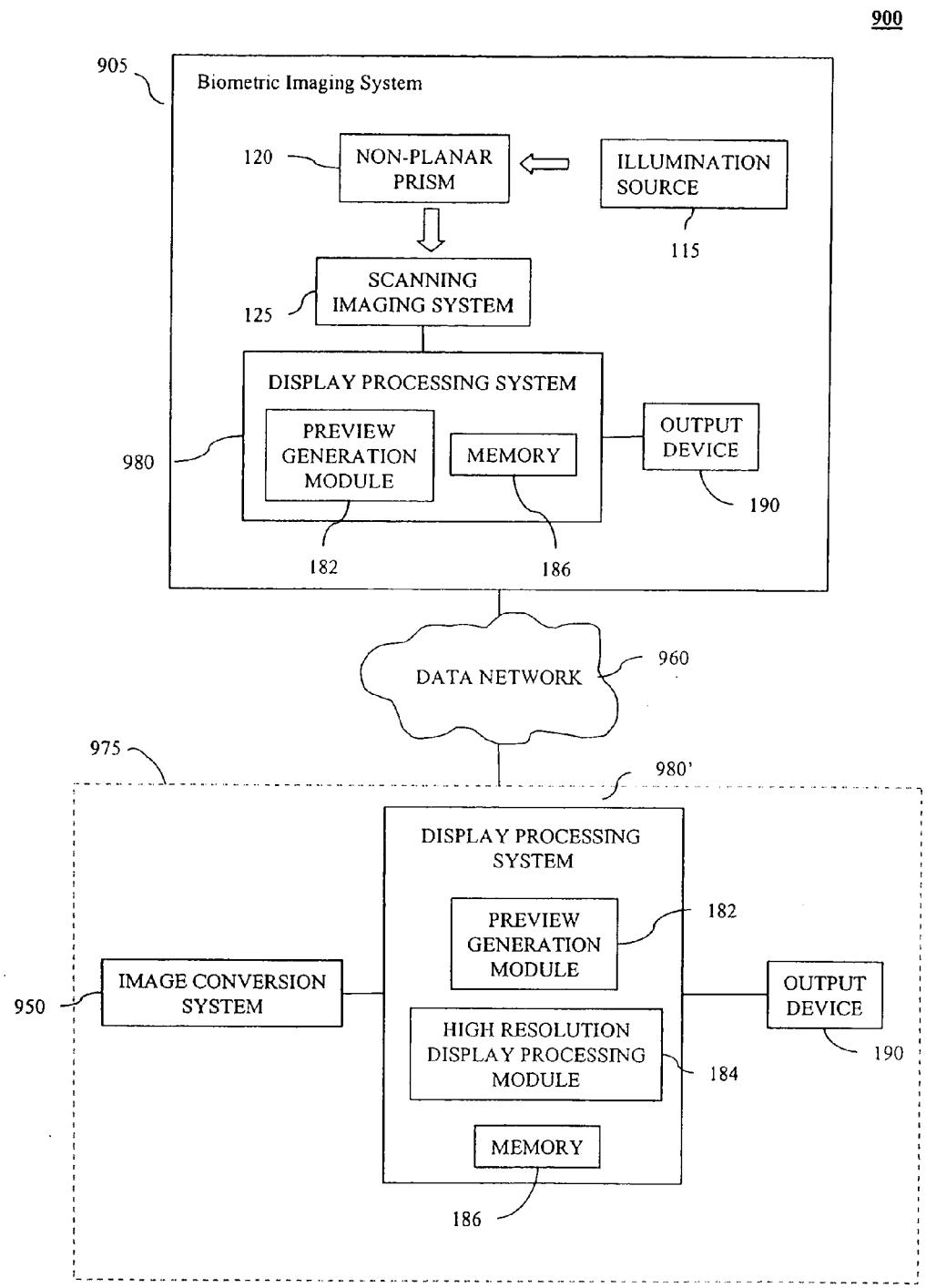
FIG. 9 shows a system incorporating distributed preview display system in accordance with an alternate embodiment of the present invention.

FIGS. 7-9 depict alternative embodiments of the preview generation system described above. FIG. 7 depicts a system 700 having a live scanner 710 coupled to an external display processing system 180 via a data network 760. In an alternate embodiment, two or more live scanners 710 are coupled to the external display processing system 780 via data network 760. The electro-optical system 125 of live scanner 710 captures raw image data and communicates the raw data to the display processing system 180 via data network 760.

Network 760 can be any type of network or combination of networks known in the art, such as a local area network (LAN), a wide area network (WAN), an intranet, or an Internet. In an embodiment of the present invention, network 760 is a data link between the biometric imaging system 710 and the external display processing system 780.

FIGS. 8A and 8B depict systems for generating both a preview display as described in FIG. 4 and a high resolution display of a selected preview display area as described in FIG. 6. System 800A includes a live scanner 810 coupled to an image conversion system 850 and a display processing system 880.

Image conversion system 850 includes a receiving module 852, a coordinate conversion module 854, and a memory 856. Image conversion system 850 is coupled to display processing system 880. Image conversion system 850 converts raw image data captured in a first coordinate system format (e.g., polar coordinates) to a second coordinate system format (e.g., rectangular coordinates). An exemplary image conversion system is described in further detail in co-pending U.S. patent application entitled, "System And Method For Capturing Print Information Using A Coordinate Conversion Method," Ser. No. 10/725,542, by Cannon et al., filed concurrently herewith and incorporated herein by reference in its entirety.

In FIG. 8B, system 800B includes a live scanner 810 coupled to an external display system 875 via a data network 860. External display system 875 has a display processing system 880 and an image conversion system 850. In an alternate embodiment, two or more live scanners 810 are coupled to the external display system 875 via data network 860.

FIG. 9 shows a block diagram of a system 900 incorporating a distributed architecture for generating a preview display and a high resolution display of a selected output area in accordance with an alternate embodiment of the present invention. System 900 includes a biometric imaging system 905 having an internal display processing system 980 coupled via data network 960 to an external display system 975 having a display processing system 980' and an image conversion system 950. Display processing is distributed between display processing system 980 and display processing system 980'. As will be appreciated by persons skilled in the relevant art(s), other architectures for distributing image conversion processing among multiple image conversion systems can be used without departing from the spirit or scope of the invention.

The terms "biometric imaging system," "scanner," "live scanner," "live print scanner," "fingerprint scanner," and "print scanner" are used interchangeably, and refer to any type of scanner which can obtain an image of all or part of one or more fingers, palms, toes, foot, hand, etc. in a live scan.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for generating a preview of a print pattern on a substantially conical platen surface, an image of the print pattern being captured in a scan made up of a series of radial scan line images along an arcuate path, comprising:

for each group of radial scan line images, the steps of:

determining a representative sensor pixel value for pixels in a group of captured radial scan line images;

converting a polar coordinate position of the respective group of captured radial scan line images to a position in rectangular display window coordinates;

plotting the representative sensor pixel values determined in said determining step at corresponding rectangular display window coordinates; and displaying the plot of the representative sensor pixel values in a display window as a preview of the print pattern image captured on the substantially conical platen surface.

2. The method of claim 1 wherein determining a representative sensor pixel value includes determining an average sensor pixel value for pixels in the group of captured radial scan lines.

3. The method of claim 1 wherein the group of radial scan line images consists of approximately 25 radial scan lines.

4. The method of claim 1 further comprising the steps of:

receiving a request for a high resolution display of a selected area of the preview of the print pattern; and converting the captured polar coordinate system image data contained in the portion of the preview of the print pattern to converted image data in a rectangular coordinate system.

5. The method of claim 4 wherein determining a representative sensor pixel value includes decimating the converted image data.

6. The method of claim 4, wherein said converting comprises:

for each pixel in the user selected area, the steps of:

performing a look up to obtain conversion data including the polar coordinate data and the polar offset data associated with respective pixel coordinates;

retrieving at least one sample of stored captured image data; and interpolating each retrieved sample with weighting based on the looked up offset data to obtain a respective pixel value in rectangular coordinate system.

7. A system for generating a display of a print pattern on a substantially conical platen surface, an image of the print pattern being captured in a scan made up of a series of radial scan line images along an arcuate path, comprising:

a non planar prism;

a scanning imaging system optically coupled to the non planar prism for capturing the image data in a polar coordinate system;

an image conversion system wherein the image conversion system comprises a coordinate conversion module for converting the polar coordinate positions of the captured radial scan line images to positions in rectangular display window coordinates; and a display processing system coupled to the scanning imaging system wherein the display processing system comprises a preview generation module for generating a preview display on the substantially conical platen surface of the captured print image preview display selected by a system user.

8. The system of claim 7 wherein the display processing system further comprises a high resolution display processing module for generating a high resolution display of an area of the preview display selected by a system user.

9. The system of claim 8 wherein the image conversion system further comprises:

a retrieval module for retrieving entries in a conversion data array and one or more samples from the captured raw polar image data;

an interpolation module for interpolating the samples using weighting based on the retrieved conversion data array entries to obtain the respective pixel values in a second coordinate system; and a communications module for communicating the converted image data to the display processing system after all pixels in the selected area have been interpolated.

10. The system of claim 7 wherein the non planar prism is a substantially conical prism.

11. The system of claim 7 wherein the scanning and capturing system is coupled to the display processing system via a data network.

* * * * *

UNITED STATES PATENT AND TRADEMARK OFFICE
CERTIFICATE OF CORRECTION

PATENT NO. : 7,321,671 B2 Page 1 of 1
APPLICATION NO. : 10/725541
DATED : January 22, 2008
INVENTOR(S) : George W. McClurg et al.

It is certified that error appears in the above-identified patent and that said Letters Patent is hereby corrected as shown below:

On the title page, Item (75), the Inventor section, please replace "Richard V Voorhees, Palm Beach Gardens, FL" with --Richard W Voorhees, Boca Raton, FL--.

Signed and Sealed this

Third Day of June, 2008

JON W. DUDAS
*Director of the United States Patent and Trademark Office*